H. A. KEINER & P. NUSSBAUM.
SAFETY OR BLOW-OFF VALVE.
APPLICATION FILED OCT. 20, 1916.
1,269,940.
Patented June 18, 1918.
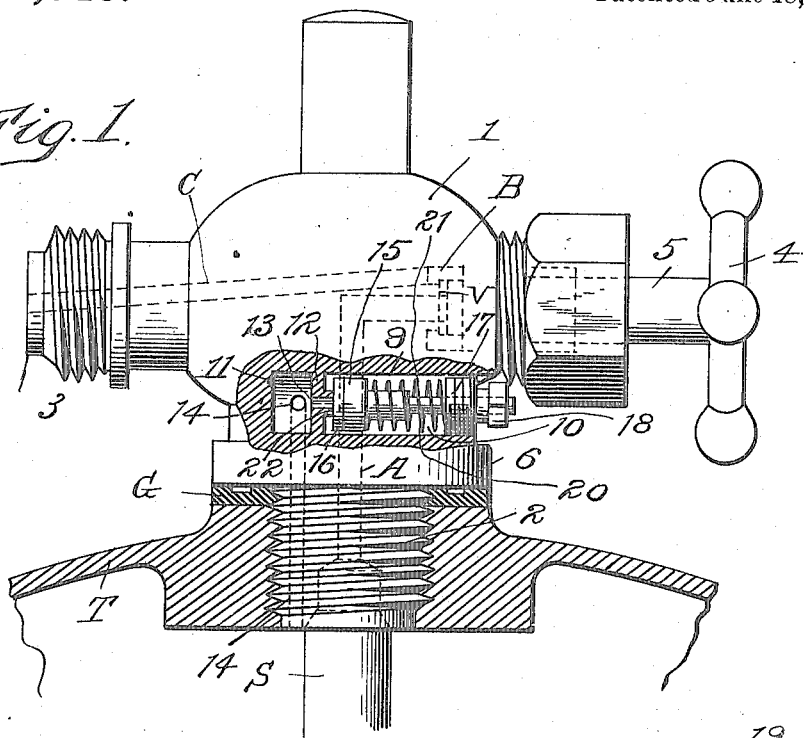
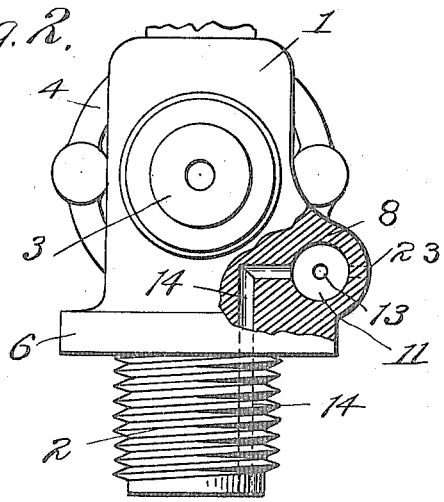
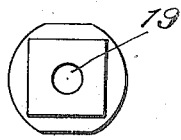
Inventor
Henry A. Keiner
Peter Nussbaum
By their Attorney
Wm. A. Courtland

UNITED STATES PATENT OFFICE.

HENRY A. KEINER, OF RICHMOND HILL, AND PETER NUSSBAUM, OF BROOKLYN, NEW YORK, ASSIGNORS TO KEINER-WILLIAMS STAMPING COMPANY, A CORPORATION OF NEW YORK.

SAFETY OR BLOW-OFF VALVE.

1,269,940.  Specification of Letters Patent.  Patented June 18, 1918.

Application filed October 20, 1916. Serial No. 126,735.

*To all whom it may concern:*

Be it known that we, HENRY A. KEINER and PETER NUSSBAUM, citizens of the United States, residing, respectively, in Richmond Hill, county of Queens, State of New York, and Brooklyn, county of Kings, State of New York, have invented certain new and useful Improvements in Safety or Blow-Off Valves, of which the following is a specification.

This invention relates in general to improvements in safety valves for high pressure receptacles and more particularly to a safety valve for tanks or receptacles employed in the storing and transporting of soda water.

The object of the invention is to construct a safety valve that can be adjusted to withstand a pressure up to a predetermined point, after which it will open and vent in a manner to prevent the over-charging of said tank.

The present invention renders impossible overcharging by reason of venting at a predetermined pressure, and the safety device being self-contained and indestructible and without replacement or adjustment of parts after venting makes it commercially satisfactory and meets the official requirements now demanded.

With these ends in view we have devised and constructed a safety valve which will hereinafter be described in detail and the features of merit and novelty pointed out in the claim.

In the accompanying drawings:

Figure 1 is a side elevation of a soda tank and valve partially broken away to show the location and operation of the safety valve.

Fig. 2 is an end elevation of the same partially in section.

Fig. 3 is a detail of the retaining plug.

Similar reference characters indicate like parts throughout the several figures.

1 is the main body of the valve provided with a threaded portion 2 which enters the tank T and is made liquid tight by means of a gasket G. 3 is the discharge end of the valve to which is attached the fountain pipe or the charging pipe. The valve body 1 has attached to the threaded portion 2 the usual siphon pipe S. The valve body has a vertical passage A leading from the siphon pipe S to the chamber B which chamber has a passage C leading therefrom to the discharge end 3 of the valve. V is a valve seat for closing the passage A and is controlled by the valve stem 5 operated by the hand wheel 4. Passages A and C, chamber B and valve seat V are shown in dotted lines to more conveniently disclose the inventions.

Preferably formed integral with the valve body just above the gasket flange 6, is an enlarged portion 8 which has a central bore 9 therein, and here shown as horizontally arranged below the main valve stem 5. This bore is divided into two chambers, a large one 10 and a small one 11, separated by a wall 12 having a small central opening 13 extending therethrough from one chamber to the other. The small chamber 11 has an opening 14 extending inward into the body of the valve and then downward through the wall of the screw threaded portion 2 which enters the tank. It will be noticed that this opening 14 does not enter the liquid discharging passage but is so placed that it will freely permit the gases to enter the small chamber 11.

Contained within the large chamber 10 and capable of moving freely therein is a piston valve 15 provided with a suitable facing of material 16 to make a desirable seat. The outer end of the bore 9 is threaded to receive a retaining plug 17 which plug is also provided without the bore, with a nut like head 18 to allow it to be screwed within the bore 9. The plug 17 is provided with a central opening 19 therethrough in which freely moves the valve stem 20. Located between the valve 15 and the plug 17 on the valve stem 20 is a pressure resisting spring 21, which holds the valve against the seat 22 of the wall 12. The plug 17 may be cut away as shown in Figs. 1 and 3 to form discharge passages for the gases when the valve 15 is unseated by reason of undue pressure in the tank. If desired the chamber 10 may be provided with a vent 23 as shown in dotted lines in Fig. 2. It can readily be observed that by forcing the retaining plug into the chamber 10, pressure of the valve 15 against the seat 22 will be increased by compression of spring 21 thereby arranging for the valve to be unseated at any predetermined pressure that may be desired.

It is desirable when these tanks are made and placed in commercial use to set the valve to release at a predetermined pressure that will meet all requirements and be safely within the limits of capacity of the tank though it should be noted that the valve can be adjusted to release at any desired pressure.

Of course it should be understood that the location, construction and operation of the safety valve may be varied in detail, without departing from the spirit of the invention.

We claim:

A valve for pressure receptacles provided with channels therethrough, and having a bore in the walls thereof divided into two chambers, with a communicating passage between said chambers, a piston valve contained within one of said chambers and adapted to close the passage between said chambers, the valve containing chamber being provided with a vent and the closed chamber having a passage extending therefrom through the wall of the controlling valve into the receptacle, the said piston valve comprising a piston acting as a closing member between the two chambers, a spring for holding the piston on its seat, and a plug having an opening therein through which the stem of the piston rides, said plug adapted to fit within the larger chamber and act as an adjustable abutment for the valve spring said plug being flattened on portions of its periphery to act as a vent for said chambers.

HENRY A. KEINER.
PETER NUSSBAUM.

Copies of this patent may be obtained for five cents each, by addressing the "Commissioner of Patents, Washington, D. C."